Jan. 3, 1928.
C. L. WHITE
1,654,848
CONTROL MECHANISM
Filed Oct. 28, 1925
2 Sheets-Sheet 1
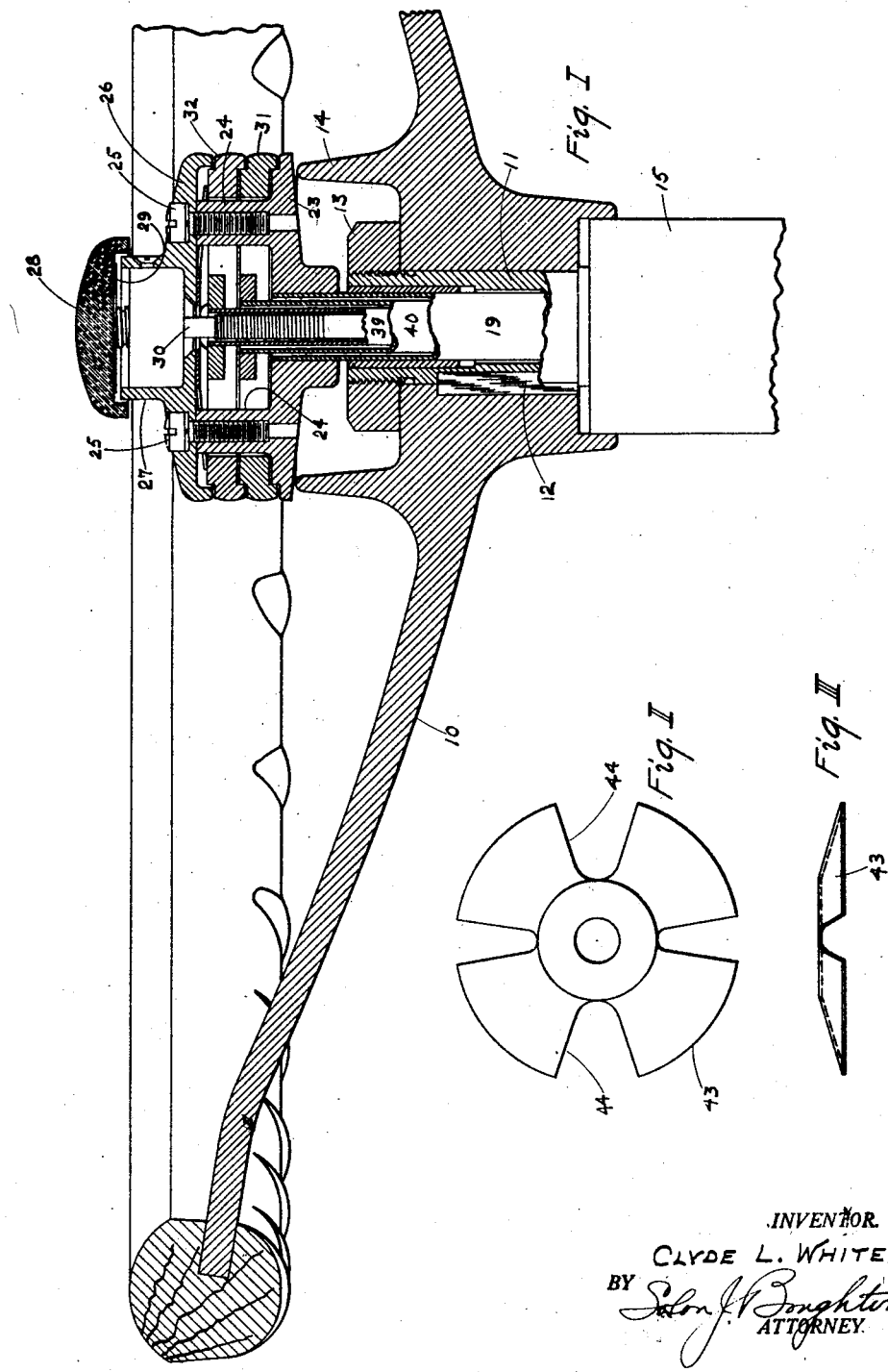
INVENTOR.
CLYDE L. WHITE
BY
ATTORNEY.

Jan. 3, 1928.
C. L. WHITE
CONTROL MECHANISM
Filed Oct. 28, 1925
1,654,848
2 Sheets-Sheet 2
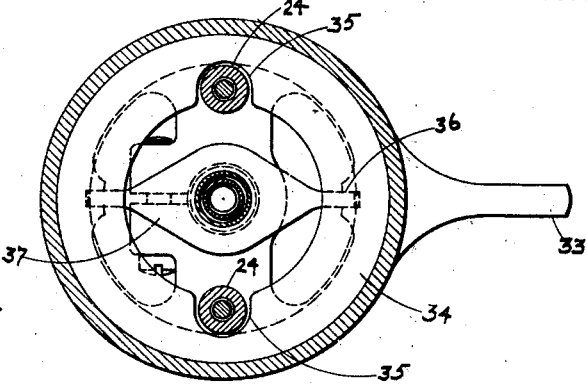
Fig. IV
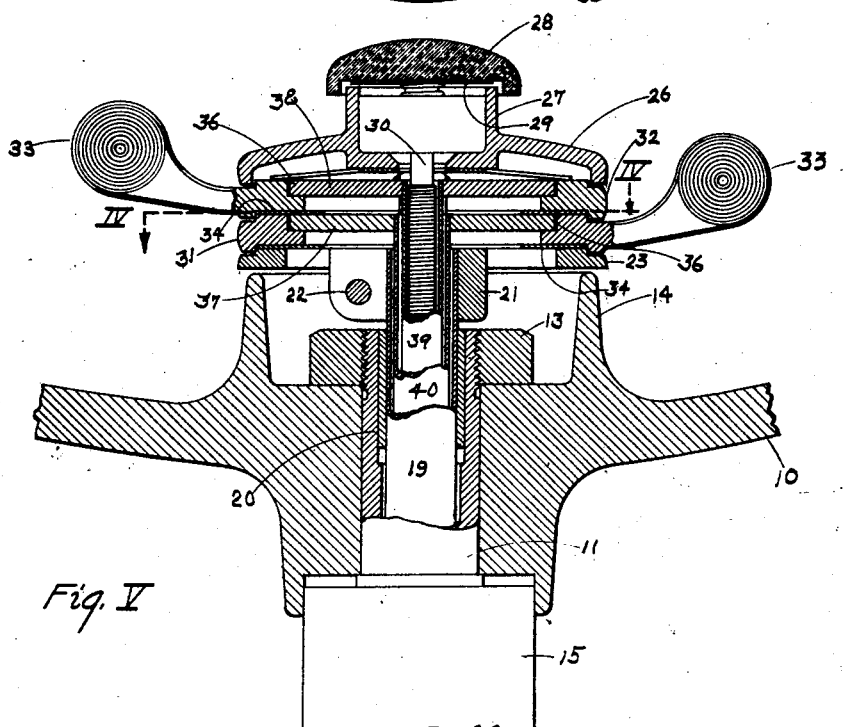
Fig. V
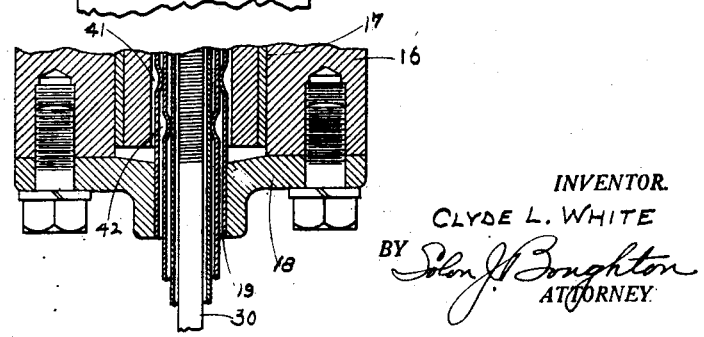
INVENTOR.
CLYDE L. WHITE
BY Solon J Boughton
ATTORNEY Patented Jan. 3, 1928.

1,654,848

UNITED STATES PATENT OFFICE.

CLYDE L. WHITE, OF TOLEDO, OHIO, ASSIGNOR TO THE WILLYS-OVERLAND COMPANY, OF TOLEDO, OHIO, A CORPORATION OF OHIO.

CONTROL MECHANISM.

Application filed October 28, 1925. Serial No. 65,459.

This invention relates to improvements in control mechanism for automobiles, that is, mechanism particularly adapted for use in connection with the spark and throttle control levers, although applicable to controls for other purposes as well.

One of the objects of the invention is the provision of a compact, easily operating, weather excluding apparatus, and one which lends itself readily to quantity production through ease of assembly, while eliminating service troubles through rigid construction and accurate centering of rotating parts.

A further object of the invention is the provision of a steering wheel hub so formed as to conceal the upper end of the steering post or tube and the clamp which holds the control mechanism to its supporting tube, thus presenting a finished, attractive appearance.

Other objects, and objects relating to details of construction and economy of manufacture, will appear as I proceed with the description of that embodiment of the invention which, for the purposes of the present application, I have illustrated in the accompanying drawings, in which:

Figure I is a vertical, diametrical section through a portion of a steering wheel and control mechanism mounted thereabove.

Fig. II is a detail plan veiw of a tensioning spring.

Fig. III is an elevational view of the same.

Fig. IV is a plan view, partly in horizontal section on the line 4—4 Fig. V.

Fig. V is a vertical, sectional view taken substantially at right angles to the plane of Fig. I through the control mechanism and steering column, the intermediate portions of the latter being broken away.

Similar reference numerals refer to like parts throughout the views.

In the drawings, 10 represents the spider of an automobile steering wheel which receives at its hub the steering post 11, the post and wheel being locked against relative rotation by suitable means such as a key 12. The upper end of the post is threaded and takes a nut 13 for holding the wheel against displacement upwardly. The nut 13 bears against the bottom surface of a cup shaped depression in the hub of the wheel resulting from the formation of the same with an annular fence 14. The steering post 11 is rotatably mounted on the stationary steering column 15 and in a casting 16 attached to the lower end of the column, as indicated in Fig. V, a bushing 17 between the casting 16 and the steering post being illustrated in that figure.

The casting 16 is closed at its lower end by a plate 18 bored at its center to receive with a tight fit a supporting tube 19, thereby centering the latter and spacing it from the rotatable steering post at the lower end. At their upper ends these parts are separated by a bushing 20. The steering tube is of a length to protrude above the nut 13 sufficiently to accommodate a clamp 21 which is split, drilled and threaded to take a clamping screw 22 by means of which the clamp may be tightened to grip the supporting tube. The clamp is integral with the base of he control lever mechanism, hereinafter termed the bottom plate 23. Extending upwardly from the top surface of this plate 23 are two hollow posts 24 which are integral and rigid with the bottom plate. The upper ends of the posts are finished to an exact height above the surface of the bottom plate and parallel therewith and are internally threaded to receive machine screws 25 by means of which a cap 26 is firmly secured to the posts and held in parallel relation to the bottom plate. The cap 26 may be formed centrally with an upwardly extending box 27 to accommodate electric contacts, the upper end of the box being closed by a horn button 28 having a metal plate 29 on its lower surface. An electrical conductor 30 extends upwardly at the center of the steering column and is electrically connected to the plate 29 by means not shown. When the horn button 28 is depressed, electric connection is made from the battery through the horn, not shown, and thence through conductor 30, plate 29, box 27, posts 24 and tube 19 to ground and back again to the battery.

Between the bottom plate 23 and the cap 26 are mounted for rotational movement a plurality of control rings, those illustrated herein being numbered 31 and 32. These rings may be identical in shape and size and each is provided with an integral radially extending handle or lever 33 for hand actuation. These rings are spaced apart and away from the bottom plate 23 by washers 34 which are notched, as shown at 35 in Fig. IV, to fit around the posts 24, the washers being thus held against rotation. I prefer to employ brass as the material for these washers.

The rings 31 and 32 and the bottom plate 23 are all rabbeted on their upper edges, and the two rings are formed with tongues or over-hangs fitting in the rabbets. The shoulders formed by the rabbets and over-hangs are carefully finished to perfect circles, accurately centered. This construction results in an accurate positioning and guiding of the rings and also in water-shedding, weather-excluding joints. The latter result is secured also at the upper side of the ring 32 by forming the cap 26 with an overhang extending into the rabbet in the ring.

Rings 31 and 32 have diametrically opposed notches 36 on their inner sides adapted to receive somewhat loosely the ends of flat bars 37 and 38. These bars are joined, preferable by brazing, to the upper ends of control tubes 39 and 40 and constitute the operating connections between these tubes and the rings. At their lower ends the control tubes are properly spaced and centered by an annular depression 41 in steering tube 19 and by a similar depression 42 in control tube 40. It is common to employ this same means at the upper ends of the tubes, but with my construction it is unnecessary to do so as the tubes are well spaced and centered by the rabbets and over-hangs in the rings and bottom plate.

In order to provide the necessary friction in the moving parts to prevent unintended rotation and without the necessity for accurate adjustment in assembling the parts, I employ a single sheet metal spring 43 to exert pressure holding the rings together and against the bottom plate 23. In its untensioned state this spring is dished to have a bearing at its center on the bottom of the cap 26 and at its outer edge on the upper ring 32, there being a plurality of slots extending inwardly from the periphery of the spring to permit it to be flattened when sufficient pressure is exerted. Two of the slots 44 are made large so as to accommodate the posts 24, which thus prevent rotation of the spring.

From the above description of its structure the operation of my invention will be clear to those skilled in the art. It will, of course, be obvious that variations from the exact structure disclosed may be resorted to without departing from the spirit of the invention.

I claim as my invention:

1. In combination, a supporting tube, a bottom plate member secured thereto, a cap member, posts integral with one of said members bridging the space between them, fastenings for holding one of said members tightly against the posts of the other member, a plurality of control rings mounted one upon the other between said plate and cap members, concentric control tubes within said supporting tube each operatively connected with one of said control rings and means for resiliently pressing said rings together and towards one of said members.

2. In combination, a supporting tube, a bottom plate member secured thereto, a cap member, posts integral with one of said members bridging the space between them, fastenings mounted on said posts adapted to draw said members tightly together, a plurality of control rings mounted one upon the other between said plate and cap members, concentric control tubes within said supporting tube each operatively connected with one of said control rings and a dished sheet metal spring also mounted between said members and adapted to resiliently exert pressure upon the said rings.

3. In combination, a supporting tube, a plate member secured thereto, a cap member, posts integral with one of said members bridging the space between them, fastenings mounted on said posts adapted to draw said members tightly together, a plurality of control rings mounted one upon the other between said plate and cap members, concentric control tubes within said supporting tube each operatively connected with one of said control rings, a dished sheet metal spring also mounted between said members and adapted to resiliently exert pressure upon the said rings, said spring having slots therein extending inwardly from its periphery for the reception of said posts.

4. In control mechanism for automobiles, a bottom plate, and a cap of substantially the same diameter spaced apart at their peripheries throughout their entire circumferences, a plurality of control rings of substantially the same diameter as said bottom plate and cap substantially filling the space between said plate and cap at their peripheries, said bottom plate and each of said rings being rabbeted at its upper, outer edge and said cap and each of said rings having an overhang at its lower, outer edge extending into the rabbet of the next adjacent part beneath, thereby forming weather-excluding joints and centering said rings.

5. In control mechanism for automobiles, a supporting tube and a bottom plate upon which the control rings are adapted to be carried, said bottom plate comprising a ring portion and a bar joining opposite sides of the ring portion, upwardly extending posts near the juncture of said ring portion and bar and a clamping portion integral with said bar adapted to grip the upper end of said supporting tube.

In testimony whereof I affix my signature.

CLYDE L. WHITE.